P. D. ULRICH.
PHOTOGRAPH WASHER.
APPLICATION FILED MAR. 18, 1918.

1,276,289.

Patented Aug. 20, 1918.
2 SHEETS—SHEET 1.

Witnesses,
Mary A. Ingles
C.E. Reinhart

Inventor,
Paul D. Ulrich
By Joshua R.H. Potts
his Attorney

P. D. ULRICH.
PHOTOGRAPH WASHER.
APPLICATION FILED MAR. 18, 1918.
1,276,289.
Patented Aug. 20, 1918.
2 SHEETS—SHEET 2.
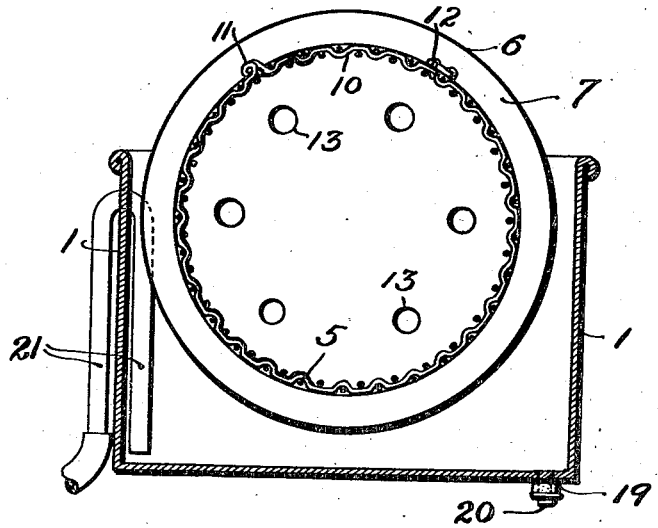
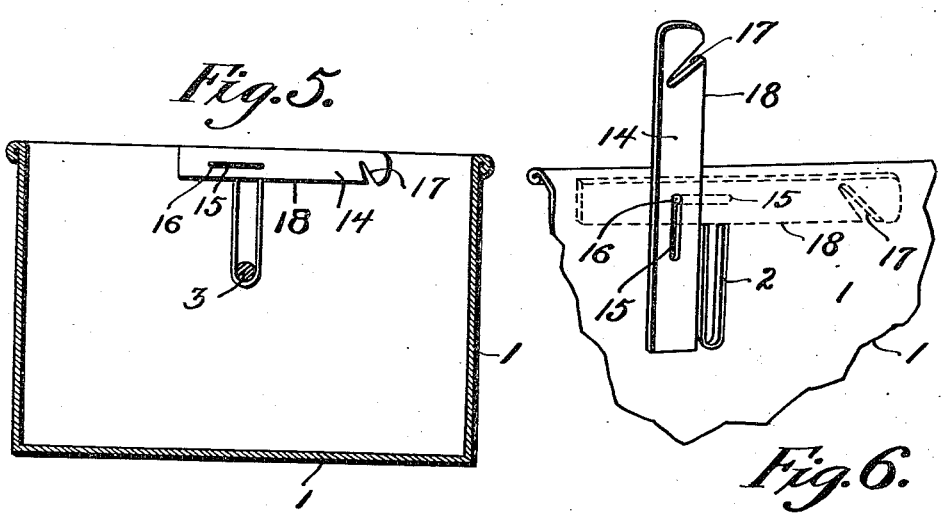
Witnesses,
M. A. Inglar
E. E. Reichart
Inventor,
Paul D. Ulrich,
By Joshua R. H. Potts
his Attorney

UNITED STATES PATENT OFFICE.

PAUL D. ULRICH, OF HERSHEY, PENNSYLVANIA, ASSIGNOR OF ONE-HALF TO ABRAHAM T. HEILMAN, OF HERSHEY, PENNSYLVANIA.

PHOTOGRAPH-WASHER.

1,276,289.   Specification of Letters Patent.   Patented Aug. 20, 1918.

Application filed March 18, 1918. Serial No. 222,993.

*To all whom it may concern:*

Be it known that I, PAUL D. ULRICH, a citizen of the United States, residing at Hershey, in the county of Dauphin and State of Pennsylvania, have invented certain new and useful Improvements in Photograph-Washers, of which the following is a specification.

One object of my invention is to provide a device of comparatively simple construction which will thoroughly and efficiently wash photographs.

Another object is to so construct my invention that the photographs can be easily and quickly inserted therein and removed therefrom.

These objects, and other advantageous ends which will be described hereinafter, I attain in the following manner, reference being had to the accompanying drawings in which—

Fig. 4 is a transverse section slightly enlarged and taken on the line 4—4 of Fig. 3, Fig. 5 is a transverse section taken on the line 5—5 of Fig. 3 and drawn on the same scale as Fig. 4, and Fig. 6 is a fragmentary perspective view showing certain of the features of my invention.

Figure 1:
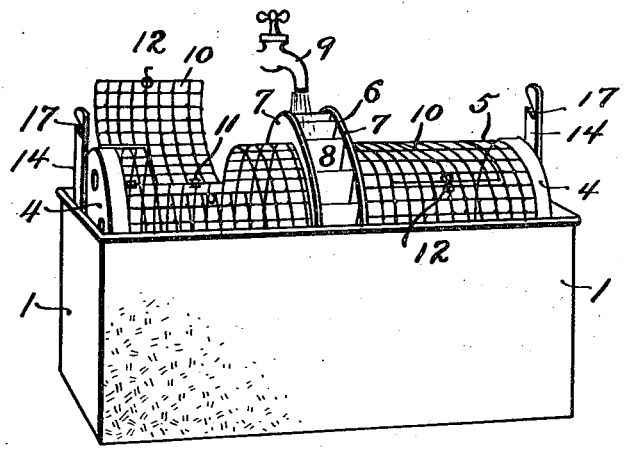
Figure 1 is a perspective view showing my improved photograph washer.

Referring to the drawings, 1 represents an elongated tank which is preferably made of galvanized sheet metal and this tank at opposite ends thereof is provided with sockets 2 which are substantially U-shape and open at their upper ends. These sockets, at their bottoms, provide bearings for trunnions 3 on opposite ends 4 of a hollow cylinder or drum 5. The portion of the drum 5 between the ends 4 is made of wire fabric or screen and this drum 5 is adapted to rotate within the tank 1.

The drum 5 has a water wheel 6 comprising two side rings 7 and blades 8 which form buckets so that when water is allowed to flow from a faucet 9 or the like (see Fig. 1) the water wheel 6 will be rotated and since the latter is attached to the drum 5 this drum will be rotated within the tank 1. The water wheel 6, as illustrated, is positioned centrally between the ends 4 so that the drum 5 is balanced and will freely rotate.

Figure 2:
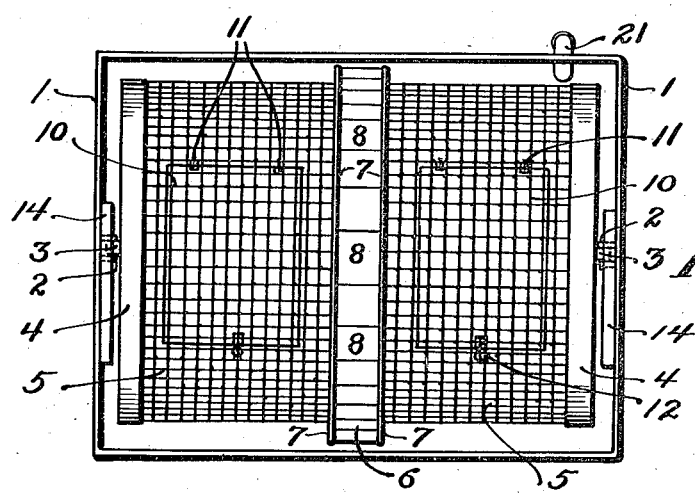
Fig. 2 is a top plan view of my invention.
Figure 3:
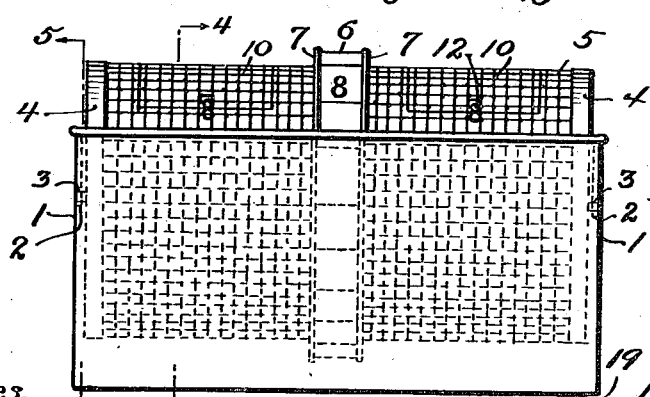
Fig. 3 is a front elevation of my invention.

The drum 5 at both sides of the water wheel 6 has gates 10 which are hinged, as at 11, and are provided with hooks 12 so that they may be secured in a closed position. Fig. 1 of the drawings shows one of these gates open to permit the insertion of photographs, and Figs. 2, 3, and 4 show the gates closed and fastened.

The ends 4 of the drum 5 are provided with holes 13 to allow the water to freely circulate through said ends. Two bars 14 are located at opposite ends of the tank 1 and have slots 15 through which extend pins 16, said pins being secured in the ends of the tank 1. These bars 14, when the drum is being rotated, can be turned into a substantially horizontal position across the bearing sockets 2, as shown in dotted lines in Fig. 6 and as shown in full lines in Fig. 4, the slots 15 permitting them to be bodily raised and then turned on the pins 16 as pivots. When it is desired to remove the photographs from the drum 5, the latter can be lifted and the trunnions 3 can be allowed to drop within angular notches 17 formed in the ends of the bars 14 so as to support the drum in a raised position.

The edges 18 of the bars 14 are adapted to engage the sides of the sockets 2 and the angular notches 17 are preferably made of such depth that the weight of the drum 5 will cause the lower ends of the bars 14 to engage the sides of the sockets 2, thus preventing accidental pivotal motion of the bars 14 on the pins 16 due to the weight of said drum.

The tank 1 is provided with an outlet pipe 19 which can be closed by a cork 20 or other suitable means so that when desired the tank can be drained of its water. I have also provided the tank 1 with an outlet or siphon pipe 21 by the aid of which water can be siphoned from the bottom of the tank, thus the chemicals which are washed from the photographs can be removed more freely than if the overflow of the tank were at the top only.

The device of my present invention can be readily lifted and carried from place to place and can be quickly and easily positioned under a spigot or faucet, the water from said faucet serving to both rotate the drum and to supply the water for washing the photographs.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A photograph washer including a tank; a drum positioned within said tank; means providing rotatable bearings for said drum; a waterwheel secured to said drum; and bars pivotally mounted on said tank and having portions providing a support for said drum when raised from its normal position in the tank, substantially as described.

2. A photograph washer including a tank; a rotatable drum positioned within said tank and having trunnions thereon; sockets forming bearings for said trunnions; bars having slots therein; and pivot means on said tank adapted to extend through the slots of said bars, said bars having notches therein forming bearings for said trunnions when the drum is raised from its normal position in the tank, said bars being adapted to engage the sides of said sockets due to the weight of said drum on the bars, substantially as described.

In testimony whereof I have signed my name to this specification in the presence of two subscribing witnesses.

PAUL D. ULRICH.

Witnesses:
ROBERT H. SATTAGAHN,
EDWIN M. HERSHEY.